United States Patent [19]
Lee

[11] Patent Number: 5,192,956
[45] Date of Patent: Mar. 9, 1993

[54] CASCADED COMPLEMENTARY PHASE CODE COMPRESSOR

[75] Inventor: Henry E. Lee, Ellicott City, Md.

[73] Assignee: Westinghouse Electric Corp., Pittsburgh, Pa.

[21] Appl. No.: 790,909

[22] Filed: Nov. 13, 1991

[51] Int. Cl.$^5$ .................... G01S 7/288; G01S 13/30
[52] U.S. Cl. ..................... 342/204; 342/202; 342/201
[58] Field of Search ............. 342/204, 203, 202, 201

[56] References Cited

U.S. PATENT DOCUMENTS

| | | | |
|---|---|---|---|
| 3,594,795 | 7/1971 | Thor et al. | 342/201 |
| 3,675,163 | 7/1972 | Hartmann et al. | 333/150 |
| 3,714,653 | 1/1973 | Thor et al. | 342/201 |
| 3,774,019 | 11/1973 | Cook | 342/189 X |
| 4,132,989 | 1/1979 | Arens | 342/25 |
| 4,293,856 | 10/1981 | Chressanthis et al. | 342/93 |
| 4,298,942 | 11/1981 | Lee | 342/194 X |
| 4,404,562 | 9/1983 | Kretschmer, Jr. et al. | 342/194 |
| 4,566,011 | 1/1986 | Lewis et al. | 342/201 |
| 4,626,853 | 12/1986 | Lee et al. | 342/132 |
| 4,723,125 | 2/1988 | Elleaume | 342/194 |
| 4,772,889 | 9/1988 | Elleaume | 342/194 |
| 5,032,843 | 7/1991 | Zilliox | 342/202 |
| 5,036,328 | 7/1991 | Nakamura et al. | 342/204 |

OTHER PUBLICATIONS

Merrill I. Skolnik, Introduction to Radar Systems, Second Edition pp. 420–440.
Marcel J.E. Golay, IRE Transactions on Information Theory, "Complementary Series", pp. 82–87.

Primary Examiner—John D. Sotomayor
Attorney, Agent, or Firm—N. A. Nixon

[57] ABSTRACT

The present invention is a system that performs code compression in stages where each stage includes two processing paths 36 and 38. The two paths allow bidirectional crossover cascade complementary code compression reducing the number processing stages to $\log_2 N$ and reducing the number of processing by a factor of $N/(2 \log_2 N)$ where N is the length of the code. Each path includes a delay provided by a delay unit 44 and each path arithmetically combines the data from its own path with data from the other path. The upper path 36 uses an adder 40 while the lower path uses an adder/substracter unit 42 which adds or subtracts depending on the phase of the transmitted complementary phase code. The delay provided in each stage increases in a binary progression with the delay of the last stage being N/2. A systolic processor 68 is the preferred embodiment although the invention could be implemented in a programmable digital signal processor. The system can also be programmed to generate codes of various lengths.

3 Claims, 4 Drawing Sheets

CASCADED COMPLEMENTARY PHASE CODE COMPRESSOR

BACKGROUND OF THE INVENTION

1. Field of the Invention

The present invention is directed to a multiple stage cascaded complementary phase code compressor and, more particularly, to a compressor which uses increasing amounts of delay in each stage along with bidirectional crossover arithmetic combinations to reduce the number of stages and the number of operations required in the compression operation.

2. Description of the Related Art

Pulse compression is commonly used in radar systems to effect an increased average transmit power while retaining the desired fine range resolution in, for example, weather radar. The peak power requirement of the transmitter device is reduced as a result of pulse compression performed by a radar receiver. The long modulated radar pulses are particularly compatible with new solid-state transmitters which are inherently capable of long duty-cycle waveforms.

Many different frequency and phase coded waveforms have been considered for radar pulse compression. The binary phase codes based on Golay's complementary series, as described in M. Golay, "Complementary Series," IRE Trans. Information Theory, April 1961, has gained much attention lately because of good sidelobe characteristics. A binary complementary code pair has the property that there is an equal number of like elements with any element spacing in the first code as the number of unlike elements with the same element spacing in the second code. When $A=(a_1, a_2, \ldots, a_N)$ and $B=(b_1, b_2, \ldots, b_N)$ are complementary code pairs of N elements, the autocorrelation of the two codes is:

$$c_j = \sum_{i=1}^{N-j} a_i a_{i+j} \quad j = 0, 1, \ldots, N-1 \quad (1)$$

$$d_j = \sum_{i=1}^{N-j} b_i b_{i+j} \quad j = 0, 1, \ldots, N-1 \quad (2)$$

Because the property of complementary codes:

$$c_0 + d_0 = 2N \quad (3)$$

$$c_j + d_j = 0, \text{ for } j \neq 0 \quad (4)$$

That is, the combination of the two autocorrelation functions will produce a range response with zero sidelobes.

The direct pulse compressor of an N-element complementary code, which is the autocorrelation process, requires N processing elements 10-16 as shown in FIG. 1. Each of the processing elements 10-16 consists of a delay unit 18 providing a delay of duration T for each range cell or sample which is implemented with, for example, a shift register, along with an adder/subtracter unit 20 performing the complex addition or subtraction of two inputs depending on the actual phase of the code element. The processing requirement of a direct pulse compressor is very significant for large pulse compression ratios. For instance, at a Pulse Repetition Frequency (PRF) of 2 KHz, 400 range gates and a pulse compression ratio of 1024:1, the compression throughput requirement is 820 million complex additions or subtractions per second and 1024 stages 10 as in FIG. 1 would be required.

SUMMARY OF THE INVENTION

It is an object of the present to reduce the number of stages required in complementary code compression.

It is also an object of the present invention to reduce the number of computations required in such a compression.

It is a further object of the present invention to provide programmable code compression with a reduced number of computations.

It is another object of the present invention to allow solid state transmitters to be used in high resolution radar systems.

The above objects can be attained by a system that performs bidirectional crossover cascade complementary code compression in stages where each stage includes two processing paths. One path includes a variable delay provided by a delay unit and each path arithmetically combines the data from its own path with data from the other path. The delay provided in each subsequent stage increases in a binary progression with the last stage having a delay of N/2 where N is the code length. The system can also be programmed to output codes of various lengths.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention implements phase decoding in multiple stages by exploiting the concatenation process that is used in generating a complementary code pair. The present invention is capable of handling code randomness caused by the application of different concatenation orders at code generation. The pulse compression throughput requirement is significantly reduced by the present invention with the improvement factor being $N/(2 \log_2 N)$ for a code of length N which amounts to a 51 to 1 reduction in the required number of complex additions or subtractions for compression of a 1024-bit complementary code.

To lower the pulse compression throughout requirement, in accordance with the present invention, complementary codes are generated through the process of concatenation. Concatenating complementary codes to form code pairs with twice the code lengths is performed in accordance with:

$$S_1 = (A \ B) = (a_1, a_2, \ldots, a_N, b_1, b_2, \ldots, b_N)$$

$$S_2 = (A\ B') = (a_1, a_2, \ldots, a_N, b_1', b_2', \ldots, b_N')$$

, where the superscript ' denotes the opposite phase. $S_1$ and $S_2$ thus formed can be shown to satisfy the basic property of complementary codes because whatever additional number of like elements at a given spacing that are generated in $S_1$, an equal number of additional unlike elements with same element spacing are generated in $S_2$.

Two simple iterative procedures to generate the complementary codes are shown in the following:
1. Front concatenation: $A = (A\ B)$ and $B = (A'\ B)$
2. Back concatenation: $A = (A\ B)$ and $B = (A\ B')$ The iterative process can begin with a 2-element complementary code pair such as $A = (1\ 1)$ and $B = (1\ -1)$. In that case, the number of times that the above procedure is iterated is given by $\log_2 N = 1$ to generate a desired code length of N, for example, $N = 16$ if the code is 16 bits long. A degree of code randomness can be provided by selecting a particular code pair to begin the iteration process, and by using either the front or back concatenation at each iteration.

The complementary codes generated as described above can be off-line generated before radar operation, and stored in a buffer memory. The desired code for each radar transmission will be selected from the memory, and used to modulate the transmitted pulse. To provide maximum flexibility in code selection and minimum memory storage requirement, the cascaded pulse compressor described herein could also be used in real-time during radar operation to generate the complementary codes. It involves simply the use of a delta function in the data inputs, i.e., the data inputs will consist of a single "one" followed by all "zeros", to the pulse compressor. The cascaded compressor outputs are complementary code pairs, code A in the upper branch and code B in the lower branch.

Figure 2:
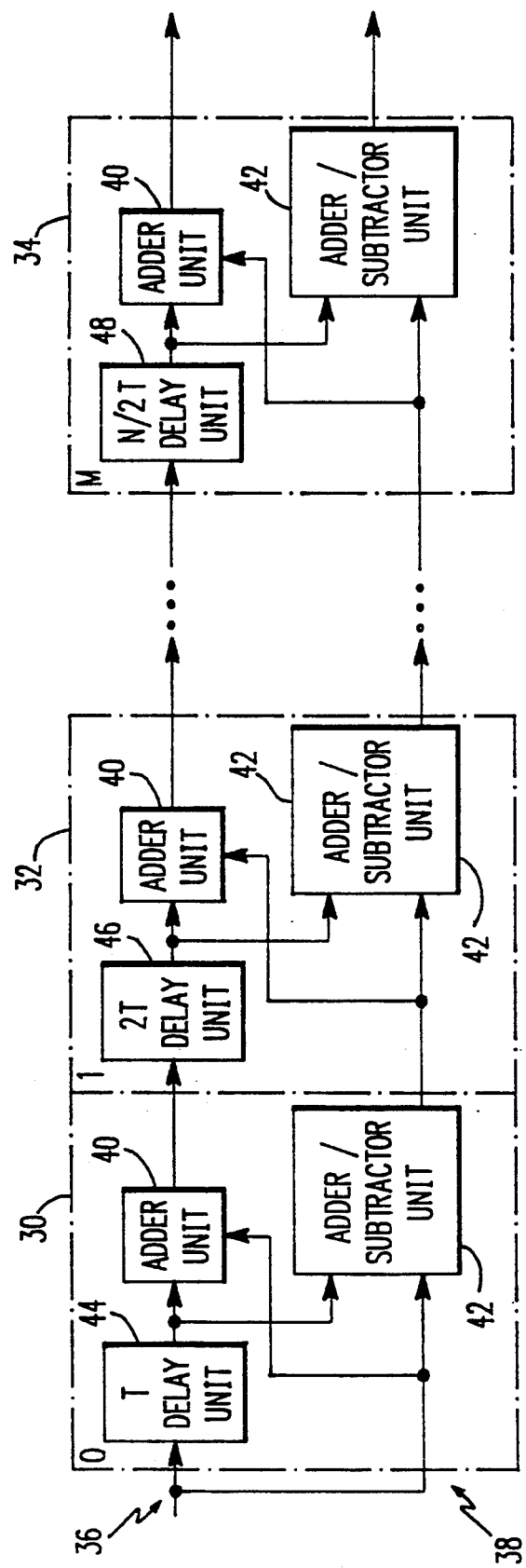
FIG. 2 illustrates a dedicated pulse compressor in accordance with the present invention.

For the complementary codes that are generated by the above concatenation process, the decoding of the codes can be performed in stages 30–34 as illustrated by the dedicated decoder 28 shown in FIG. 2. The first stage 30 of decoding produces outputs that are the desired decoded outputs of the 2-element code pair A and B given previously. The decoding operation consists of two sum operations, the upper one is for the A code and the lower one is for the B code. The above process is repeated for codes with length more than two. For instance, if 4-bit complementary code pair which is front concatenated from the two bit codes is to be decoded, a second decoder stage 32 as shown in FIG. 2 is added. Notice that the delay is now 2T in duration versus T in the first decoding stage. Again, only two summing units are needed for this stage 32 as in the first stage 30.

For an N-bit complementary code pair which is generated by concatenation, the cascaded compressor 28 is shown in the overall block diagram of FIG. 2. This compressor 28 performs bidirectional crossover cascade compression in which the processing paths have two data crossover connections making data transfer during the compression operation bidirectional. The compressor provides the input on the input bus 35 to two branches or processing paths 36 and 38, and each branch or path consists of $\log_2 N$ processing nodes where a processing node is either an adder unit 40 or an adder/subtracter unit 42. The operation of the upper branch nodes is always addition, but the addition/subtraction operation of the lower branch adder/subtracter unit 42 is controlled by the concatenation sequence at the original generation of complementary code. The upper branch output is the compressed code $C_A$ and the lower branch output gives compressed code $C_B$. Each of the delay units 44–48 provides a different amount of data. The first stage 30 provides a single time unit delay T, the second 32 two time units (2T) of delay, the third (not shown) provides 4 units (4T) of delay, the fourth (not shown) provides 8T units of delay while the last delay unit 34 provides N/2T units of delay. For example, for a code with a length $N = 1024$ the number of stages would be ten and the last stage would provide 512 units of delay. The delay in the present invention is in terms of processing cycles of the units 40 and 42 and is equal to the time between samples by the radar system. In a dedicated compressor 28, as illustrated in FIG. 2, each adder unit 40 and adder/subtracter unit 42 is a conventional device. The delay units preferably are FIFO register groups serially connected to provide the appropriate delay. For example the delay unit 46 of the second stage is preferably two serially connected conventional parallel input/output registers each being clocked with a clock corresponding to the sample clock. During operation the transmitter transmits alternately, at a pulse repetition frequency, a first pulse encoded with code A and a second pulse encoded with code B. Upon receipt of the return pulse the code A pulse is decoded followed by decoding the code B pulse. Each of these decoded returns has a sidelobe which when the two decoded returns are added together cancel each other out, thereby achieving sidelobe suppression.

Figure 1:
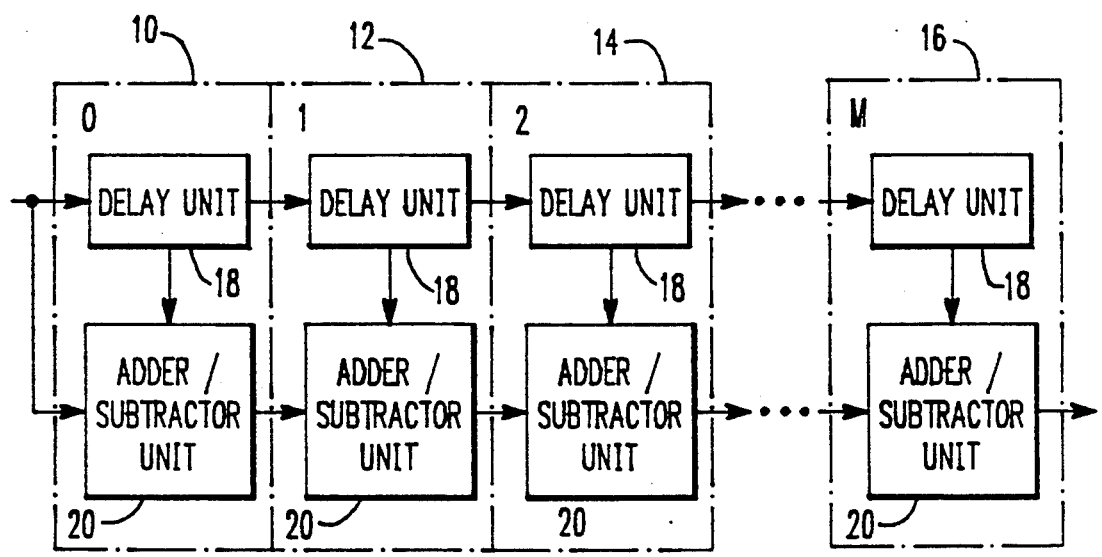
FIG. 1 illustrates a prior art direct pulse compression device.
Figure 3:
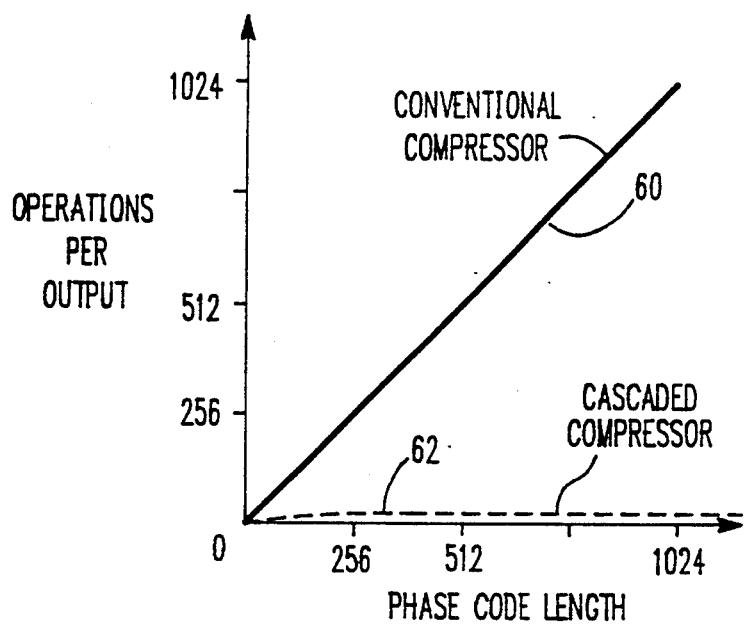
FIG. 3 illustrates the computation savings provided by the present invention over the prior art.

The total amount of processing of this new cascaded pulse compressor is significantly reduced from the direct pulse compression approach, as shown in FIG. 3. The throughput reduction factor is $N/(2\log_2 N)$. Line 60 illustrates the number of computations required for a conventional compressor as illustrated in FIG. 1 while line 62 illustrates the number of operations required in the present invention. For the same example considered previously, the compression requirement is only 16 million complex additions or subtractions per second. This amounts to a 51:1 reduction for a 1024-bit code.

The invention can also be implemented in a programmable digital signal processor conventionally found in radar systems using a software implementation. An example of a Fortran program which implements the bidirectional crossover cascaded pulse compression of the present invention is set forth in the Appendix. The major components of the software program are: setting up the control parameters and data inputs, data compression through the stages, and the selection of compression outputs. The data inputs of the example program is for a 16 bit complementary code, but the compression processing is applicable to any length code and any combination of code concatenation rules.

Figure 4:
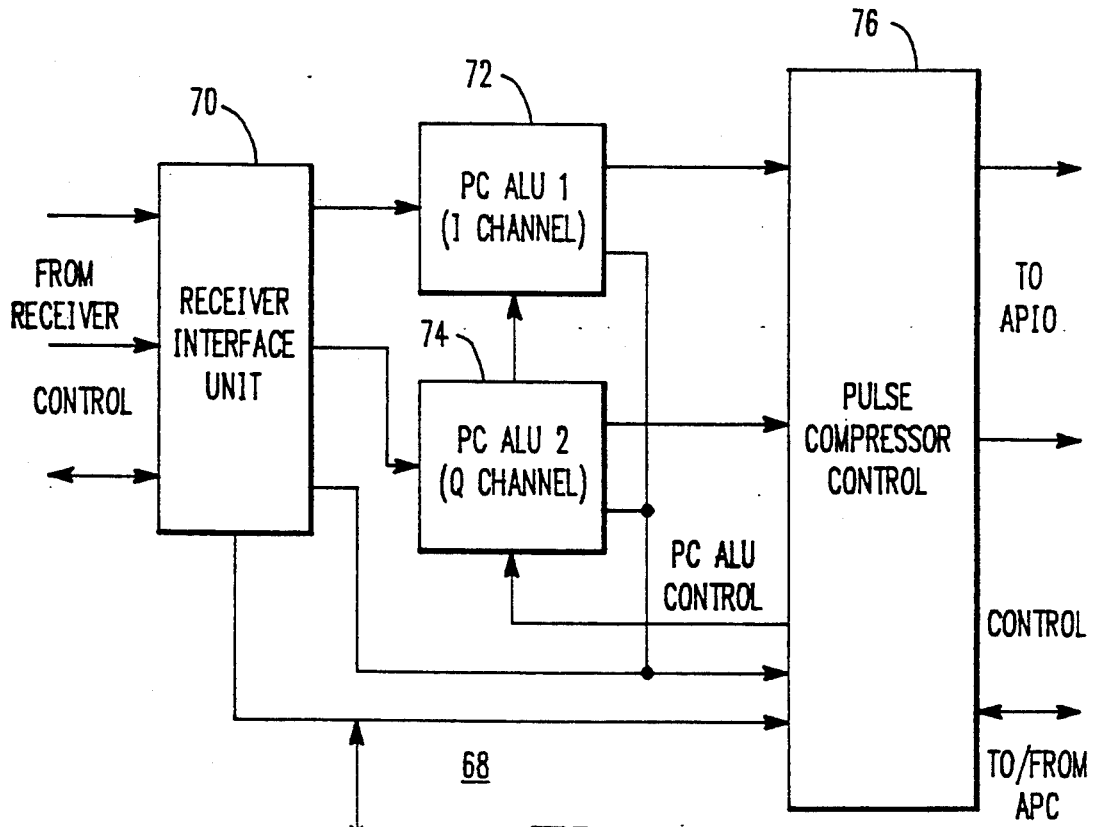
FIG. 4 illustrates the components of a programmable compressor.
Figure 5A:
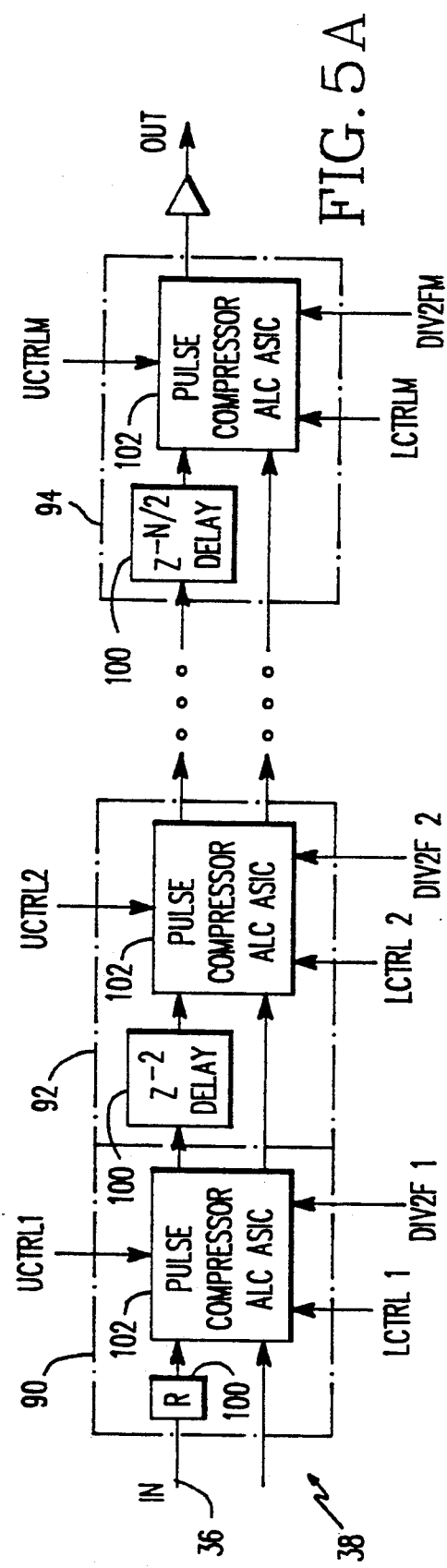
FIGS. 5A and 5B illustrates the components of a compressor.
Figure 5B:
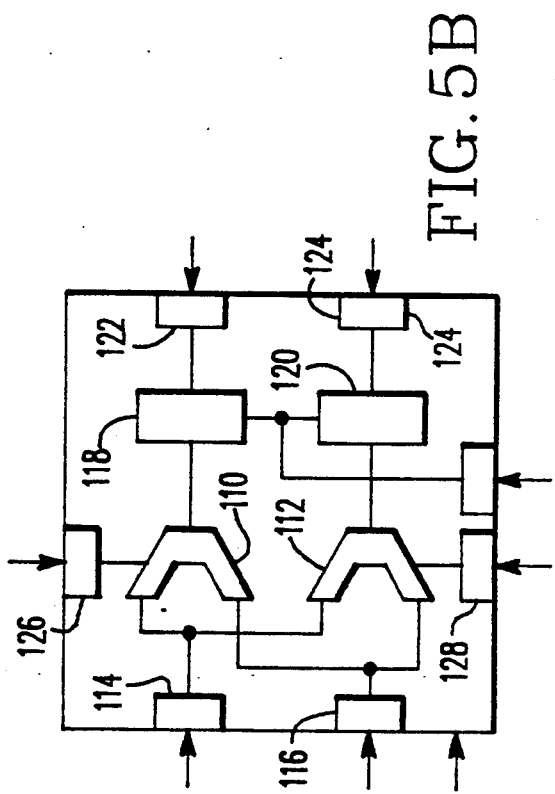

Because of the systolic nature of the compressor and the need for near real time processing speed, it is preferable that the invention be implemented as a dedicated programmable digital pulse compressor 68, located at the front end of the programmable signal processor and employing state-of-the-art very large scale integrated (VLSI) systolic processing devices. A functional block diagram of such a hardware implementation is shown in FIG. 4. A conventional receiver interface unit 70 preconditions the complex digital received samples of each radar transmission prior to the pulse compression operation. This unit 70 performs the channel matching between the sum, delta and/or guard receiver channels, the balancing between the in-phase (I) and the quadrature phase (Q) components of each of the receiver channels and the removal of doppler frequency modulation using conventional processing components to perform these conventional operations. The pulse compression operation of each receiver is performed by two arithmetic logic units (ALUs) 72 and 74, one 72 for the I-channel and one 74 for the Q-channel. The details of these circuits are illustrated in FIGS. 5A and 5B. The compressed outputs are checked for validity, and selected for further processing in a pulse compression controller 76 (PCC). The controller 76 is a conventional device which also monitors the input data and controls signal normalization within the pulse compression process.

All of the parallel pulse compression (PC) ALU channels perform essentially the same function. One PC ALU channel is shown in FIGS. 5A and 5B. It consists of M stages M=$\log_2$N, where N is maximum desired pulse compression ratio arranged in a pipeline fashion. Each stage (90-94) of the pipeline consists of a delay element 100 (a register or FIFO series of registers) and a programmable PC ALU 102 which is preferably an application specific integrated circuit (ASIC). Each PC ALU 102 contains two function selectable ALUs 110 and 112. For stage 1, a single register is used to produce a one-sample delay. In all other stages, FIFOs are used to create delays ranging from two to N/2 samples. For each stage, the output of the top rail ALU of the previous stage is input to register 114, and the output of the delay element 100 is input to register 116. During normal operation, the top rail ALU 110 always performs an A+B operation, while the bottom rail ALU 112 performs an A-B or B-A operation depending on the compression code selected. The results of these top and bottom rail operations are then divided by two (a down shift one bit) by conventional dividers 118 and 120 for normalization and noise reduction if so commanded by PCC 76. The division would normally be commanded for every other stage. The final values are stored in registers 122 and 124 and passed onto the next pulse compression stage. Control registers 126 and 128 of two bits each store control words which designate add A+B, subtract A-B, subtract B-A and pass. When pass is the command the ALUs 110 and 112 perform no mathematical operations and just transfer the input in the corresponding path to the output. The pass command allows subsequent stages to perform no decoding allowing an easy shift from a code of length 1024 to a code of length 512, etc. As a result, the number of stages in the decoder 68 should be the maximum number $\log_2$N for the maximum expected code length N.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:
1. A code decoder, comprising:
 input means for receiving a phase code signal; and
 decoding means for performing bidirectional crossover cascade compression of the complementary phase code signal, wherein when said code has a length of N, where N is a positive integer, said decoding means comprises $\log_2$N decoding stages, wherein each of said stages includes a stage number K from 1 to $\log_2$N and comprises:
 first and second input paths;
 a delay unit connected to said first input path and providing a delay of $2^{k-1}$ time units;
 an adder connected to said delay unit and said second input path; and
 an adder/subtracter connected to said delay unit and said second input path.
2. A decoder as recited in claim 1, wherein said input means receives a delta function and said decoding means generates the complementary phase code signal.
3. A code decoder, comprising:
 input means for receiving a complementary phase code signal; and
 decoding means for performing bidirectional crossover cascade compression of the complementary phase code signal, where when said code has a length of N, where N is a positive integer, said decoding means comprises $\log_2$N decoding stages, where each of said stages includes a stage number K from 1 to $\log_2$N and each stage comprises:
 first and second input paths;
 a delay unit connected to said first input path and providing a delay of $2^{K-1}$ time units;
 an adder connected to said delay unit and said second input path; and
 an adder/subtracter connected to said delay unit and said second input path.

* * * * *